(12) United States Patent
Mizusaki et al.

(10) Patent No.: US 9,394,452 B2
(45) Date of Patent: Jul. 19, 2016

(54) INK COMPOSITION

(71) Applicant: Nissin Chemical Industry Co., Ltd., Echizen-shi, Fukui-ken (JP)

(72) Inventors: Toru Mizusaki, Echizen (JP); Takeshi Fukuzumi, Echizen (JP)

(73) Assignee: NISSIN CHEMICAL INDUSTRY CO., LTD., Echizen-Shi (JP)

( * ) Notice: Subject to any disclaimer, the term of this patent is extended or adjusted under 35 U.S.C. 154(b) by 0 days.

(21) Appl. No.: 14/720,118

(22) Filed: May 22, 2015

(65) Prior Publication Data
US 2015/0337151 A1 Nov. 26, 2015

(30) Foreign Application Priority Data
May 26, 2014 (JP) ................. 2014-107923

(51) Int. Cl.
C08K 5/541 (2006.01)
C09D 11/02 (2014.01)
C09D 11/322 (2014.01)
C09D 11/102 (2014.01)
C08K 5/5419 (2006.01)
C09D 11/38 (2014.01)

(52) U.S. Cl.
CPC ............ *C09D 11/322* (2013.01); *C08K 5/5419* (2013.01); *C09D 11/102* (2013.01); *C09D 11/38* (2013.01)

(58) Field of Classification Search
CPC ..... C08K 5/541; C08K 5/5415; C08K 5/5419
See application file for complete search history.

(56) References Cited

U.S. PATENT DOCUMENTS

| 7,201,795 B2 | 4/2007 | Takemoto et al. |
| 8,646,891 B2 | 2/2014 | Hasegawa et al. |
| 2007/0242119 A1 | 10/2007 | Koganehira et al. |
| 2009/0297716 A1 | 12/2009 | Koganehira et al. |
| 2010/0010121 A1 | 1/2010 | Koganehira et al. |
| 2010/0289848 A1 | 11/2010 | Koganehira et al. |

FOREIGN PATENT DOCUMENTS

| EP | 1 234 859 A1 | 8/2002 |
| JP | 2003-253166 A | 9/2003 |
| JP | 2005-120181 A | 5/2005 |
| JP | 2007-154021 A | 6/2007 |
| JP | 2011-46035 A | 3/2011 |
| JP | 2013-203910 A | 10/2013 |

OTHER PUBLICATIONS

European Patent Office Search Report dated Aug. 27, 2015 for EP Application No. 15169022.9.

*Primary Examiner* — Vu A Nguyen
(74) *Attorney, Agent, or Firm* — Birch, Stewart, Kolasch & Birch, LLP

(57) ABSTRACT

An ink composition comprising (A) a polyether-modified silicone having formula (I), (B) a polyether-modified silicone having formula (II), water, a water-soluble organic solvent and a colorant has excellent dispersibility, wettability, and penetrability, and is water soluble and suitable for high-speed printing.

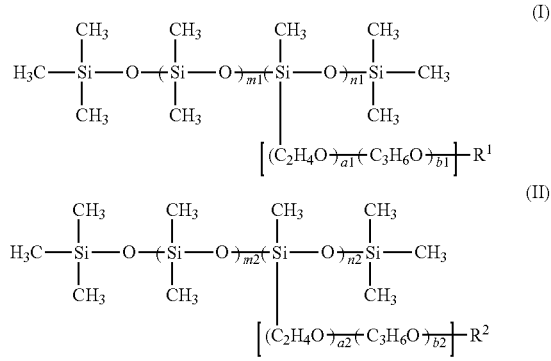

2 Claims, No Drawings

INK COMPOSITION

CROSS-REFERENCE TO RELATED APPLICATION

This non-provisional application claims priority under 35 U.S.C. §119(a) on Patent Application No. 2014-107923 filed in Japan on May 26, 2014, the entire contents of which are hereby incorporated by reference.

TECHNICAL FIELD

This invention relates to an ink composition comprising a plurality of-polyether-modified silicones. More particularly, it relates to an ink composition which is combined with a water/water-soluble organic solvent mixture to formulate an inkjet ink which is fully wetting and penetrable and thus amenable to high-speed printing and high-speed application.

BACKGROUND ART

In the current printing industry, transition to aqueous ink systems (or water/low-volatile water-soluble organic solvent mixture-based. ink systems) is in progress due to environmental concerns and other considerations. Since the aqueous systems are slow drying, their production speed is lower than the solvent systems. The aqueous system must be tailored so as to comply with high-speed operation targeting productivity improvements. It is required to improve the performance of in so as to be compliant with high-speed printing and high-speed application.

Under such circumstances, in the ink and aqueous coating industries, there is a need for surfactants having a surface tension reducing ability and imparting a low contact angle so that the ink or coating composition may be improved in substrate wetting, substrate penetration and dispersion. For a choice of surfactant, a static surface tension is important when the system is stationary, whereas an index of dynamic surface tension is important during high-speed operation to meet a need for printing speed-up for the productivity improvement purpose.

Typical of known silicone-based surfactants are modified polysiloxane compounds. Among these, polyether-modified silicones are heretofore regarded useful as wetting and dispersing agents for ink and coating compositions, as described in Patent Documents 1 to 4. However, when added to ink compositions, not all polyether-modified silicones having excellent wettability and penetrability are effective for preventing color bleeding and providing good color development and printed image uniformity. It is difficult to identify the structure of polyether-modified silicones and select a proper one.

Patent Document 5 discloses an ink composition comprising different polyether-modified silicones. When this ink composition is printed onto relatively poor absorptive papers such as coated paper, problems like uneven printing, blur or bleeding arise. For the effect derived from such a combination of polyether-modified silicones, there is still left room to improve.

CITATION LIST

Patent Document 1: JP-A 2003-253166 (EP 1234859, U.S. Pat. No. 7,201,795)
Patent Document 2: JP-A 2007-154021
Patent Document 3: JP-A 2011-046035
Patent Document 4: JP-A 2013-203910 (U.S. Pat. No. 8,646,891)
Patent Document 5: JP-A 2005-120181

DISCLOSURE OF INVENTION

An object of the invention to provide an ink composition which is so wettable and penetrable that even when printed onto relatively poor absorptive media such as glossy paper, it may form printed images with good color development and uniformity and without color bleeding, and which lends itself to high-speed printing and high-speed application.

The inventors have found that an ink composition comprising a plurality of specific polyether-modified silicones has sufficient wettability and penetrability to form printed images with good color development and uniformity and without color bleeding and lends itself to high-speed printing and high-speed application.

The invention provides an ink composition comprising (A) 0.01 to 5% by weight of a polyether-modified silicone having the average compositional formula (I), (B) 0.01 to 5% by weight of a polyether-modified silicone having the average compositional formula (II), water, a water-soluble organic solvent, and a colorant. The polyether-modified silicone (A) has the average compositional formula (I):

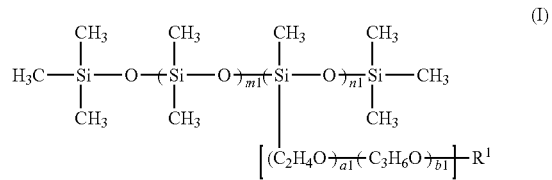

wherein $R^1$ is hydrogen, an alkyl group of 1 to 4 carbon atoms or acetyl group, m1 is an integer of at least 0, n1 is an integer of at least 1, m1+n1 is an integer of 1 to 6, a1×n1 is an integer of 2 to 20, b1×n1 is an integer of 0 to 100, and units (a1) and (b1) may be arranged randomly or blockwise. The polyether-modified silicone (B) has the average compositional formula (II):

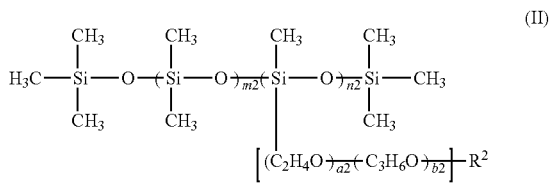

wherein $R^2$ is hydrogen, an alkyl group of 1 to 4 carbon atoms or acetyl group, m2 is an integer of at least 1, n2 is an integer of at least 1, m2+n2 is an integer of 15 to 40, a2×n2 is an integer of 5 to 100, b2×n2 is an integer of 0 to 100, and units (a2) and (b2) may be arranged randomly or blockwise.

The invention also provides an inkjet ink comprising the ink composition defined above.

ADVANTAGEOUS EFFECTS OF INVENTION

Due to excellent wettability and penetrability, the ink composition ensures to form printed images with good color development and uniformity and without color bleeding and is amenable to high-speed printing and high-speed application. By virtue of these advantages, the ink composition is practically very useful as a water/water-soluble organic solvent mixture-based inkjet ink. Particularly when printed onto relatively poor absorptive papers such as coated paper, the composition exhibits sufficient printing performance to form images with a high print density and high color density of printed image and free of bleeding or blur.

DESCRIPTION OF PREFERRED EMBODIMENTS

The ink composition of the invention comprises two types of specific polyether-modified silicones (A) and (B), water, a water-soluble organic solvent, and a colorant.

Component (A) is a polyether-modified silicone having the average compositional formula (I).

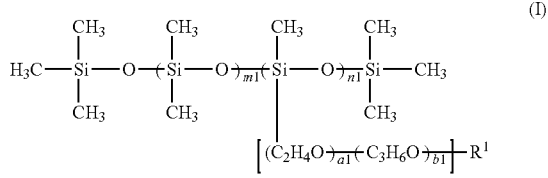

In formula (I), $R^1$ is hydrogen, an alkyl group of 1 to 4 carbon atoms or acetyl group, preferably hydrogen, methyl or acetyl. The subscript m1 is an integer of at least 0, n1 is an integer of at least 1, and m1+n1 is an integer of 1 to 6, preferably an integer of 1 to 3. If m1+n1 is greater than 6, wettability may not be exerted immediately after application to substrates such as paper.

The value of $a1 \times n1$ is an integer of 2 to 20, preferably an integer of 5 to 15. Preferably a1 is an integer of 5 to 10. If $a1 \times n1$ is less than 2, component (A) may not dissolve in water, leaving insoluble matter in the ink composition. If $a1 \times n1$ exceeds 20, wettability may not be exerted immediately after application.

The value of $b1 \times n1$ is an integer of 0 to 100, preferably an integer of 0 to 50. Preferably b1 is an integer of 0 to 10. If $b1 \times n1$ is greater than 100, component (A) may not dissolve in water, leaving insoluble matter in the ink composition. The units (a1) and (b1), i.e., $C_2H_4O$ and $C_3H_6O$ units may be arranged randomly or blockwise, with the arrangement sequence of units being not limited.

The amount of component (A) used to prepare the ink composition is preferably 0.01 to 5% by weight, more preferably 0.05 to 3% by weight based on 100% by weight of the ink composition. If the amount of component (A) is less than 0.01% by weight, the ink composition may foam, causing blur or bleeding on printing. If the amount of component (A) is greater than 5% by weight, water solubility may be adversely affected, causing blur or bleeding on printing.

Component (B) is a polyether-modified silicone having the average compositional formula (II).

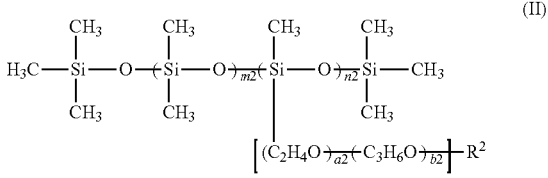

In formula (II), $R^2$ is hydrogen, an alkyl group of 1 to 4 carbon atoms or acetyl group, preferably hydrogen, methyl or acetyl. The subscript m2 is an integer of at least 1, n2 is an integer of at least 1, and m2+n2 is an integer of 15 to 40, preferably an integer of 20 to 40. If m2+n2 is less than 15, wettability may not be exerted immediately before drying. If m2+n2 is greater than 40, the ink composition may become repellent to substrates such as paper.

The value of $a2 \times n2$ is an integer of 5 to 100, preferably an integer of 20 to 100. Preferably a2 is an integer of 7 to 30. If $a2 \times n2$ is less than 5, component (B) may not dissolve in water, leaving insoluble matter in the ink composition. If a2+n2 exceeds 100, the ink composition may not fully exert wettability immediately before drying.

The value of $b2 \times n2$ is an integer of 0 to 100, preferably an integer of 20 to 100. Preferably b2 is an integer of 7 to 30. If $b2 \times n2$ is more than 100, component (B) may not dissolve in water, leaving insoluble matter in the ink composition. The units (a2) and (b2), i.e., $C_2H_4O$ and $C_3H_6O$ units may be arranged randomly or blockwise, with the arrangement sequence of units being not limited.

The amount of component (B) used to prepare the ink composition is preferably 0.01 to 5% by weight, more preferably 0.05 to 3% by weight based on 100% by weight of the ink composition. If the amount of component (B) is less than 0.01% by weight, the ink composition may become short in penetration, causing blur or bleeding on printing. If the amount of component (B) is greater than 5% by weight, water solubility may be adversely affected, causing blur or bleeding on printing.

The ink composition further comprises water and a water-soluble organic solvent. Water is preferably used in an amount of 5 to 95% by weight, more preferably 50 to 90% by weight based on 100% by weight of the ink composition. Examples of the water-soluble organic solvent include glycols such as ethylene glycol, diethylene glycol, triethylene glycol, propylene glycol, dipropylene glycol, tripropylene glycol, polyethylene glycol having a molecular weight of up to 2,000, 1,3-propylene glycol, isopropylene glycol, isobutylene glycol, 1,4-butanediol, 1,3-butanediol, 1,5-pentanediol, 1,6-hexanediol, glycerol, mesoerythritol, pentaerythritol, thioglycol, and hexylene glycol, alkyl alcohols of 1 to 4 carbon atoms, glycol ethers, formamide, acetamide, dimethyl sulfoxide, sorbitol, sorbitan, acetin, diacetin, triacetin, sulfolane, polyols such as 1,2,6-hexanetriol and trimethylolpropane, urea, 2-pyrrolidone, N-methyl-2-pyrrolidone, diethylene glycol monomethyl ether, diethylene glycol monoethyl ether, diethylene glycol monopropyl ether, diethylene glycol monobutyl ether, ethylene glycol monomethyl ether, ethylene glycol monoethyl ether, ethylene glycol monopropyl ether, and ethylene glycol monobutyl ether, which may be used alone or in admixture of two or more. The water-soluble organic solvent may be used in an amount of preferably 1 to 60% by weight, more preferably 1 to 50% by weight based on 100% by weight of the ink composition.

The colorant in the ink composition may be selected from dyes, organic pigments and inorganic pigments. Examples of the dye include colorants classified as acid dyes, direct dyes, reactive dyes, vat dyes, sulfur dyes and food colors as well as those classified as oil colors and basic dyes in the Colour Index. Suitable pigments for black ink include carbon blacks (C.I. Pigment black 7) such as furnace black (color black), lamp black, acetylene black and channel black. Specific examples include Raven 7000, Raven 5750, Raven 5250, Raven 5000, Raven 3500, Raven 2000, Raven 1500, Raven 1250, Raven 1200, Raven 1190 ULTRA-II, Raven 1170, Raven 1255 (available from Columbian Chemicals Company), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (available from Cabot Corporation), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (available from Degussa), No. 25, No. 33, No. 40, No. 47, No. 52, No. 900, No. 2300, MCF-88, MA600, MA7, MA8 and MA100 (available from Mitsubishi Chemical Corporation); metals such as copper oxide, iron oxide (C.I. Pigment Black 11) and titanium oxide; and organic pigments such as aniline black (C.I. Pigment Black 1). Suitable pigments for color ink include C.I. Pigment Yellow 1 (Fast Yellow G), 3, 12 (Disazo Yellow AAA), 13, 14, 17, 24, 34, 35, 37, 42 (Yellow Iron Oxide), 53, 55, 74, 81, 83 (Disazo Yellow HR), 93, 94, 95, 97, 98, 100, 101, 104, 108, 109, 110, 117, 120, 128, 138, 153, 180, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Rake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 202, 206, 209, 219, C.I. Pigment Violet 19, 23, C.I. Pigment Orange 36, C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C.I. Pigment Green 1, 4, 7, 8, 10, 17, 18, 36, etc. The colorant is preferably used in an amount of 0.1 to 15% by weight, more preferably 2 to 10% by weight based on 100% by weight of the ink composition.

The ink composition may be prepared, for example, by mixing the above components on any well-known mixers such as a propeller agitator. If necessary, those components which are solid at room temperature are heated prior to mixing.

If desired, a resin and other additives may be added to the above components when an ink is prepared from the ink composition.

Suitable resins are polymers derived from a substance having at least one hydrophobic group selected from alkyl, cycloalkyl, and aryl groups. The preferred substance further has a hydrophilic group selected from carboxyl, sulfonate, hydroxyl, amino and amide groups, and salts thereof. Examples of the substances to form dispersing polymers include monomers having a double bond-bearing group such as acryloyl, methacryloyl, vinyl or aryl, and oligomers thereof. Examples include styrene, tetrahydrofurfuryl acrylate, butyl methacrylate, (α, 2, 3 or 4)-alkylstyrenes, (α, 2, 3 or 4)-alkoxystyrenes, 3,4-dimethylstyrene, α-phenylstyrene, divinylbenzene, vinyl naphthalene, dimethylamino (meth) acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, other alkyl (meth)acrylates, methoxydiethylene glycol (meth)acrylate, ethoxy, propoxy, or butoxy-bearing diethylene glycol or polyethylene glycol (meth)acrylate, cyclohexyl (meth)acrylate, benzyl (meth)acrylate, phenoxyethyl (meth)acrylate, isobornyl (meth)acrylate, hydroxyalkyl (meth)acrylates, fluorine, chlorine or silicon-bearing (meth) acrylates, (meth)acrylamides, and maleic acid amides. Where it is desired to introduce a crosslinking structure into (meth) acrylic acid or the like in addition to its mono-functionality, compounds having an acrylic or methacrylic group may be used, for example, (mono, di, tri, tetra or poly)ethylene glycol di(meth)acrylates, (meth)acrylates of diols such as 1,4-butanediol, 1,5-pentanediol, 1,6-hexanediol, 1,8-octanediol and 1,10-decanediol, trimethylolpropane tri(meth)acrylate, glycerol (di or tri)-(meth)acrylates, di(meth)acrylates of bisphenol A or F ethylene oxide adducts, neopentyl glycol di(meth) acrylate, pentaerythritol tetra(meth)acrylate, and dipentaerythritol hexa(meth)acrylate.

The amount of the resin used to prepare the ink composition is not particularly limited. An appropriate amount of the resin is 0 to 30% by weight, more preferably 0 to 20% by weight based on 100% by weight of the ink composition. When used, the resin is preferably added in an amount of at least 1% by weight.

Suitable additives which can be added herein include UV absorbers, antioxidants, pH control agents, preservatives, and viscosity modifiers. In addition to the above components, the ink composition may contain these additives as the balance to make 100% by weight.

The ink composition is typically adjusted to a viscosity of from more than 0 to 4 mPa·s at 23° C. to provide better printing performance.

Ink can be applied by an inkjet recording method, a recoding method with writing utensils such as a pen, and various other printing methods. Especially, the ink composition is suited for use in the inkjet recording method.

The substrate to which ink is applied may be selected from a wide range of substrates including absorptive recording media, low absorptive recording media, and non-absorptive recording media.

Suitable absorptive recording media include, but are not limited to, plain papers with high ink penetrability such as electrophotography paper; inkjet printing papers (special inkjet printing papers having an ink absorptive layer composed of silica or alumina particles or an ink absorptive layer composed of a hydrophilic polymer, typically polyvinyl alcohol (PVA) or polyvinyl pyrrolidone (PVP)); and coated papers with relatively low ink penetrability such as art papers and cast-coated papers for use in general offset printing.

Suitable low absorptive recording media include, but are not limited to, coated papers having on their surface a coating layer receptive to oil-base ink. Typical coated papers are printing papers including art paper, coated paper and mat paper.

Suitable non-absorptive recording media include, but are not limited to, plastic films free of an ink absorptive layer, and paper and other substrates having a plastic layer coated thereon or a plastic film bonded thereto. Examples of the plastic material used herein include polyvinyl chloride (PVC), polyethylene terephthalate (PET), polycarbonate, polystyrene, polyurethane, polyethylene, and polypropylene.

As used herein, the "low absorptive recording media" and "non-absorptive recording media" refer to those recording media having a water absorption volume of 10 ml/m$^2$ or less from the start of contact to 30 msec$^{1/2}$ as measured by the Bristow method. The Bristow method is widely used as the method for measuring a fluid absorption volume in a short time while reference may be made to "Japan TAPPI paper and pulp test method 2000", Standard No. 51 "Paper and paper board—fluid absorption test method—Bristow method". The substrate to which ink is applied is preferably selected from absorptive recording media having relatively low ink penetrability such as art paper, coated paper and cast-coated paper as demonstrated by a water absorption volume of 15 ml/m$^2$ or less from the start of contact to 30 msec$^{1/2}$ as measured by the Bristow method; low absorptive recording media such as art paper, coated paper and cast-coated paper; and non-absorptive recording media such as PET and PVC.

Preferably the ink is applied to the substrate in a coating weight of 0.6 to 20 g/m², more preferably 1 to 15 g/m².

EXAMPLE

Examples are given below by way of illustration and not by way of limitation. All parts and % are by weight.

Example 1

With stirring by a propeller agitator, 5 parts of Color Black S170 (available from Degussa) as black pigment was gradually added to 69 parts of ion exchanged water. Then 0.5 part of polyether-modified silicone (A-1) as component (A), 0.5 part of polyether-modified silicone (B-1) as component (B), 10 parts of polyethylene glycol (molecular weight 200) and 15 parts of glycerol were added. Further stirring for one hour yielded a black ink composition.

Similarly, magenta (M), cyan (C) and yellow (Y) ink compositions were prepared using magenta pigment (C.I. Pigment Red 122), cyan pigment (C.I. Pigment Blue 15:3) and yellow pigment (C.I. Pigment Yellow 74) instead of the black pigment, respectively.

Examples 2 to 10 and Comparative Examples 1 to 17

As in Example 1, ink compositions were prepared in accordance with the formulation shown in Tables 1 to 4.

Notably, BYK347 and BYK325 are polyether-modified silicone surfactants (BYK Japan K.K.).

The substrate to which ink was to be applied was OK topcoated paper (Oji Paper Co., Ltd.) in Examples 2 to 7 and Comparative Examples 1 to 13, and offset printing coated paper having a water absorption volume of 10 ml/m² at 30 ms$^{1/2}$ in Examples 8 to 10 and Comparative Examples 14 to 17.

(A) Polyether-Modified Silicone

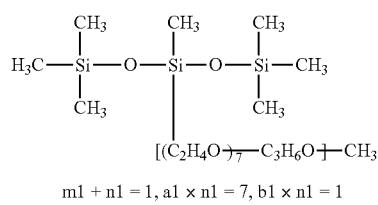

(A-1)

$m1 + n1 = 1, a1 \times n1 = 7, b1 \times n1 = 1$

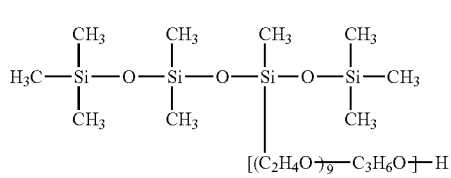

(A-2)

$m1 + n1 = 2, a1 \times n1 = 9, b1 \times n1 = 1$

-continued

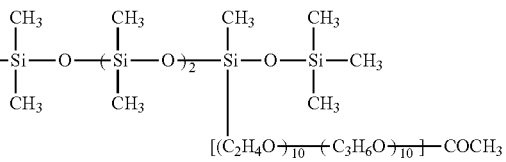

(A-3)

$m1 + n1 = 3, a1 \times n1 = 10, b1 \times n1 = 10$

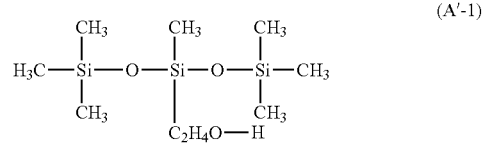

(A'-1)

$m1 + n1 = 1, a1 \times n1 = 1, b1 \times n1 = 0$

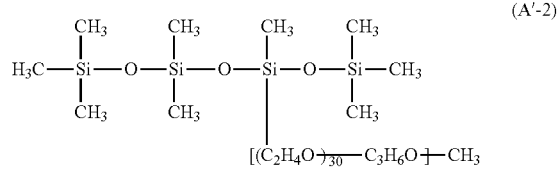

(A'-2)

$m1 + n1 = 2, a1 \times n1 = 30, b1 \times n1 =$

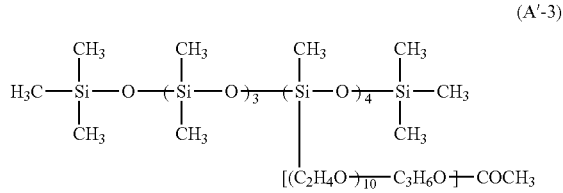

(A'-3)

$m1 + n1 = 7, a1 \times n1 = 40, b1 \times n1 = 4$

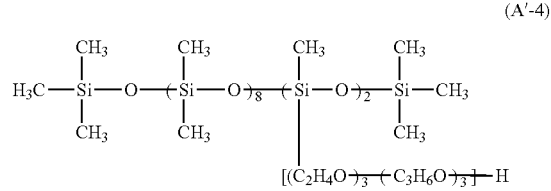

(A'-4)

$m1 + n1 = 10, a1 \times n1 = 6, b1 \times n1 = 6$ (B) Polyether-Modified Silicone

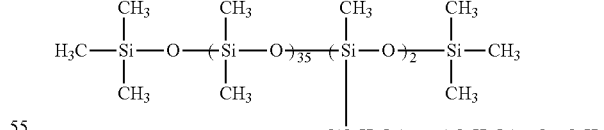

(B-1)

$m2 + n2 = 37, a2 \times n2 = 50, b2 \times n2 = 50$

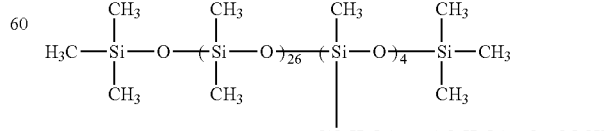

(B-2)

$m2 + n2 = 30, a2 \times n2 = 60, b2 \times n2 = 60$

-continued

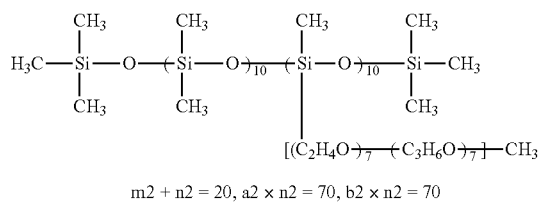

(B-3)

$m2 + n2 = 20, a2 \times n2 = 70, b2 \times n2 = 70$

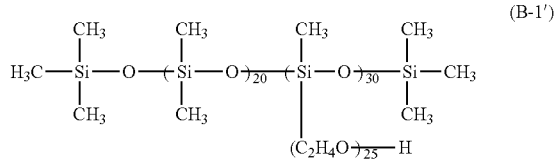

(B-1')

$m2 + n2 = 50, a2 \times n2 = 300, b2 \times n2 = 0$

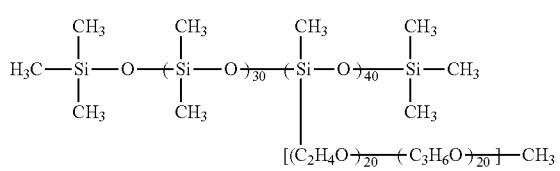

(B-2')

$m2 + n2 = 70, a2 \times n2 = 800, b2 \times n2 = 800$

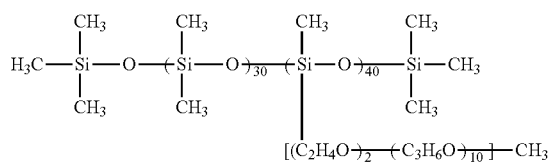

(B-3')

$m2 + n2 = 70, a2 \times n2 = 80, b2 \times n2 = 400$

The performance of each ink composition was evaluated by the following tests. The results are shown in Tables 1 to 4.

Evaluation of Ink (1) Print Density

Using a printer PX-045A (Seiko-Epson Co., Ltd.), a dot image was printed with the black ink on OK topcoated paper or offset printing coated paper. The print density of dots was measured by a microdensitometer Sakura PDM-5 (Sakura Seiki Co., Ltd.). The print density is preferably 0.99 to 1.10, more preferably 1.01 to 1.10.

(2) Dot Diameter

Using the printer PX-045A, a dot image was printed with the black ink on OK topcoated paper or offset printing coated paper. The dot image was observed under an electron microscope with a magnifying power of 100 to measure the diameter of dots. The dot diameter is preferably 200 to 250 μm, more preferably 220 to 240 μm.

(3) Color Density of Printed Image

Using the printer PX-045A, each of black (B), magenta (M), cyan (C) and yellow (Y) inks was solid printed on OK topcoated paper or offset printing coated paper. The color density was measured by a Macbeth densitometer (RD-918, manufactured by Macbeth). The color density is preferably 1.35 to 2.00, more preferably 1.40 to 2.00.

(4) Uniformity of Printed Image

Using the printer PX-045A, each of black, magenta, cyan and yellow inks was printed on OK topcoated paper or offset printing coated paper. The printed image was observed under an electron microscope with a magnifying power of 100 and evaluated for leveling ability. The leveling ability or density difference was rated according to the following criteria.

○: substantially no difference in density

Δ: slight difference

×: crescent mottles within dot (5) Shape Factor of Dot

Using the printer PX-045A, each of black, magenta, cyan and yellow inks was printed on OK topcoated paper or offset printing coated paper. From the printed image, the shape factor of a dot was computed as (peripheral length)$^2$/($4\pi$*area). The shape factor is a value for quantitatively evaluating the degree of bleeding or blur. The peripheral length and area are determined from image analysis by a dot analyzer. A dot of least irregular shape has a shape factor of nearly 1.

(6) Gloss

Using the printer PX-045A, each of black, magenta, cyan and yellow inks was printed on OK topcoated paper (gloss 6) or offset printing coated paper. Gloss, Gs(θ) was measured at an angle of 20° by a glossmeter (handy type PG-IM by Nippon Denshoku Industries Co., Ltd.). A higher value of gloss indicates better gloss.

TABLE 1

| Component (wt %) | | Example | | | | | | |
| --- | --- | --- | --- | --- | --- | --- | --- | --- |
| | | 1 | 2 | 3 | 4 | 5 | 6 | 7 |
| Pigment (B/M/C/Y) | | 5 | 5 | 5 | 5 | 5 | 5 | 5 |
| A | A-1 | 0.5 | | | 0.2 | | 0.1 | 2.5 |
| | A-2 | | 0.5 | | | 0.2 | | |
| | A-3 | | | 0.5 | | | | |
| | A'-1 | | | | | | | |
| | A'-2 | | | | | | | |
| | A'-3 | | | | | | | |
| | A'-4 | | | | | | | |
| | BYK 347 | | | | | | | |
| B | B-1 | 0.5 | | | 0.2 | 0.2 | 0.1 | 2.5 |
| | B-2 | | 0.5 | | | | | |
| | B-3 | | | 0.5 | | | | |
| | B'-1 | | | | | | | |
| | B'-2 | | | | | | | |
| | B'-3 | | | | | | | |
| | BYK 325 | | | | | | | |
| Ethylene glycol | | | | | 0.2 | | | |
| Diethylene glycol | | | | | | 0.2 | | |
| Polyethylene glycol | | 10 | 10 | 10 | 10 | 10 | 10 | 10 |

TABLE 1-continued

| Component (wt %) | | Example 1 | 2 | 3 | 4 | 5 | 6 | 7 |
|---|---|---|---|---|---|---|---|---|
| Glycerol | | 15 | 15 | 15 | 15 | 15 | 15 | 15 |
| Water | | 69 | 69 | 69 | 69.4 | 69.4 | 69.8 | 65 |
| Print Density | | 1.04 | 1.02 | 1.03 | 1.02 | 1.04 | 1.02 | 1.05 |
| Dot Diameter | | 233 | 235 | 231 | 233 | 234 | 231 | 237 |
| Color Density of | B | 1.33 | 1.45 | 1.42 | 1.33 | 1.43 | 1.31 | 1.34 |
| Printed Image | M | 1.47 | 1.44 | 1.51 | 1.48 | 1.45 | 1.42 | 1.48 |
| | C | 1.81 | 1.86 | 1.79 | 1.82 | 1.86 | 1.79 | 1.83 |
| | Y | 1.46 | 1.47 | 1.51 | 1.47 | 1.46 | 1.44 | 1.47 |
| Uniformity of | B | ○ | ○ | ○ | ○ | ○ | ○ | ○ |
| Printed Image | M | ○ | ○ | ○ | ○ | ○ | ○ | ○ |
| | C | ○ | ○ | ○ | ○ | ○ | ○ | ○ |
| | Y | ○ | ○ | ○ | ○ | ○ | ○ | ○ |
| Shape Factor of | B | 1.2 | 1.3 | 1.4 | 1.2 | 1.4 | 1.3 | 1.3 |
| Dot | M | 1.3 | 1.4 | 1.5 | 1.3 | 1.5 | 1.4 | 1.4 |
| | C | 1.3 | 1.4 | 1.5 | 1.3 | 1.5 | 1.4 | 1.4 |
| | Y | 1.2 | 1.3 | 1.4 | 1.3 | 1.4 | 1.3 | 1.3 |
| Gloss | B | 6 | 6 | 5 | 5 | 5 | 5 | 6 |
| | M | 7 | 6 | 6 | 6 | 5 | 6 | 7 |
| | C | 7 | 6 | 6 | 6 | 6 | 6 | 7 |
| | Y | 7 | 7 | 6 | 6 | 6 | 6 | 7 |

TABLE 2

| Component (wt %) | | Comparative Example 1 | 2 | 3 | 4 | 5 | 6 | 7 | 8 | 9 | 10 | 11 | 12 | 13 |
|---|---|---|---|---|---|---|---|---|---|---|---|---|---|---|
| Pigment (B/M/C/Y) | | 5 | 5 | 5 | 5 | 5 | 5 | 5 | 5 | 5 | 5 | 5 | 5 | 5 |
| A | A-1 | | | | 0.4 | | | 0.005 | 7 | 1 | | | 0.5 | |
| | A-2 | | | | | 0.4 | | | | | | | | |
| | A-3 | | | | | | 0.4 | | | | | | | |
| | A'-1 | 0.5 | | | | | | | | | | | | |
| | A'-2 | | 0.5 | | | | | | | | | | | |
| | A'-3 | | | 0.5 | | | | | | | | 1 | | |
| | A'-4 | | | | | | | | | | | | 0.5 | |
| | BYK347 | | | | | | | | | | | | | 0.5 |
| B | B-1 | 0.5 | 0.5 | 0.5 | | | | 0.005 | 7 | | 1 | | | |
| | B-2 | | | | | | | | | | | | | |
| | B-3 | | | | | | | | | | | | | |
| | B'-1 | | | | 0.4 | | | | | | | | | |
| | B'-2 | | | | | 0.4 | | | | | | | | |
| | B'-3 | | | | | | 0.4 | | | | | | | |
| | BYK325 | | | | | | | | | | | | | 0.5 |
| Ethylene glycol | | | | | | 0.2 | | | | | | | | |
| Diethylene glycol | | | | | | | 0.2 | | | | | | | |
| Polyethylene glycol | | 10 | 10 | 10 | 10 | 10 | 10 | 10 | 10 | 10 | 10 | 10 | 10 | 10 |
| Glycerol | | 15 | 15 | 15 | 15 | 15 | 15 | 15 | 15 | 15 | 15 | 15 | 15 | 15 |
| Water | | 69 | 69 | 69 | 69.2 | 69 | 69 | 69.99 | 56 | 69 | 69 | 69 | 69 | 69 |
| Print Density | | 0.98 | 0.98 | 0.98 | 0.95 | 0.93 | 0.94 | 0.91 | 0.98 | 0.98 | 0.93 | 0.9 | 0.98 | 0.91 |
| Dot Diameter | | 200 | 198 | 189 | 197 | 195 | 195 | 190 | 196 | 197 | 195 | 191 | 197 | 1.92 |
| Color Density of | B | 1.12 | 1.12 | 1.12 | 1.11 | 1.12 | 1.09 | 1.09 | 1.12 | 1.12 | 1.11 | 1.08 | 1.12 | 1.09 |
| Printed Image | M | 1.25 | 1.25 | 1.25 | 1.25 | 1.23 | 1.23 | 1.23 | 1.24 | 1.24 | 1.21 | 1.2 | 1.24 | 1.21 |
| | C | 1.37 | 1.37 | 1.37 | 1.38 | 1.39 | 1.34 | 1.34 | 1.35 | 1.35 | 1.32 | 1.3 | 1.35 | 1.31 |
| | Y | 1.25 | 1.25 | 1.25 | 1.22 | 1.23 | 1.23 | 1.23 | 1.22 | 1.22 | 1.23 | 1.21 | 1.22 | 1.22 |
| Uniformity of | B | X | X | X | X | X | X | X | X | X | X | X | X | X |
| Printed Image | M | X | X | X | X | X | X | X | X | X | X | X | X | X |
| | C | X | X | X | X | X | X | X | X | X | X | X | X | X |
| | Y | X | X | X | X | X | X | X | X | X | X | X | X | X |
| Shape Factor of | B | 2.8 | 2.7 | 2.7 | 2.7 | 2.7 | 2.7 | 3.0 | 2.9 | 2.8 | 3.0 | 3.0 | 2.8 | 3.0 |
| Dot | M | 2.9 | 2.7 | 2.8 | 2.7 | 2.8 | 2.8 | 3.1 | 3.0 | 2.9 | 2.9 | 2.9 | 2.9 | 3.1 |
| | C | 2.8 | 2.9 | 2.8 | 2.8 | 2.7 | 2.9 | 2.9 | 2.8 | 2.9 | 3.1 | 3.1 | 2.9 | 3.2 |
| | Y | 2.9 | 2.8 | 2.8 | 2.7 | 2.8 | 2.7 | 3.0 | 2.9 | 2.8 | 3.0 | 2.9 | 2.8 | 3.0 |
| Gloss | B | 2 | 1 | 1 | 2 | 1 | 1 | 1 | 2 | 2 | 2 | 2 | 1 | 1 |
| | M | 3 | 2 | 2 | 2 | 2 | 2 | 1 | 2 | 2 | 2 | 2 | 2 | 2 |
| | C | 3 | 2 | 2 | 2 | 2 | 1 | 1 | 2 | 2 | 2 | 2 | 2 | 2 |
| | Y | 3 | 2 | 2 | 2 | 2 | 2 | 2 | 2 | 2 | 2 | 2 | 2 | 2 |

TABLE 3

| Component (wt %) | | Example 8 | Example 9 | Example 10 |
|---|---|---|---|---|
| | Pigment (B/M/C/Y) | 5 | 5 | 5 |
| A | A-1 | 0.5 | | |
| | A-2 | | 0.5 | |
| | A-3 | | | 0.5 |
| | A'-1 | | | |
| B | B-1 | 0.5 | | |
| | B-2 | | 0.5 | |
| | B-3 | | | 0.5 |
| | B'-1 | | | |
| | Polyethylene glycol | 10 | 10 | 10 |
| | Glycerol | 15 | 15 | 15 |
| | Water | 69 | 69 | 69 |
| | Print Density | 1.03 | 1.01 | 1.02 |
| | Dot Diameter | 234 | 234 | 232 |
| Color Density of Printed Image | R | 1.32 | 1.46 | 1.42 |
| | M | 1.48 | 1.45 | 1.5 |
| | C | 1.8 | 1.87 | 1.78 |
| | Y | 1.45 | 1.46 | 1.50 |
| Uniformity of Printed Image | B | ○ | ○ | ○ |
| | M | ○ | ○ | ○ |
| | C | ○ | ○ | ○ |
| | Y | ○ | ○ | ○ |
| Shape Factor of Dot | B | 1.2 | 1.3 | 1.4 |
| | M | 1.3 | 1.3 | 1.4 |
| | C | 1.3 | 1.4 | 1.5 |
| | Y | 1.3 | 1.3 | 1.4 |
| Gloss | B | 6 | 6 | 6 |
| | M | 6 | 6 | 6 |
| | C | 7 | 6 | 6 |
| | Y | 7 | 7 | 6 |

TABLE 4

| Component (wt %) | | Comparative Example 14 | Comparative Example 15 | Comparative Example 16 | Comparative Example 17 |
|---|---|---|---|---|---|
| | Pigment (B/M/C/Y) | 5 | 5 | 5 | 5 |
| A | A-1 | | 0.4 | 1 | |
| | A-2 | | | | |
| | A-3 | | | | |
| | A'-1 | 0.5 | | | |
| B | B-1 | 0.5 | | | 1 |
| | B-2 | | | | |
| | B-3 | | | | |
| | B'-1 | | 0.4 | | |
| | Polyethylene glycol | 10 | 10 | 10 | 10 |
| | Glycerol | 15 | 15 | 15 | 15 |
| | Water | 69 | 69.2 | 69 | 69 |
| | Print Density | 0.98 | 0.95 | 0.97 | 0.93 |
| | Dot Diameter | 201 | 197 | 198 | 196 |
| Color Density of Printed Image | B | 1.11 | 1.12 | 1.12 | 1.11 |
| | M | 1.26 | 1.25 | 1.24 | 1.21 |
| | C | 1.38 | 1.39 | 1.36 | 1.33 |
| | Y | 1.26 | 1.23 | 1.22 | 1.23 |
| Uniformity of Printed Image | B | X | X | X | X |
| | M | X | X | X | X |
| | C | X | X | X | X |
| | Y | X | X | X | X |
| Shape Factor of Dot | B | 2.9 | 2.6 | 2.8 | 2.9 |
| | M | 2.9 | 2.7 | 3.0 | 2.9 |
| | C | 2.9 | 2.8 | 2.9 | 3.2 |
| | Y | 3 | 2.7 | 2.9 | 3.0 |
| Gloss | B | 2 | 2 | 2 | 2 |
| | M | 2 | 2 | 2 | 2 |
| | C | 3 | 2 | 2 | 2 |
| | Y | 3 | 2 | 2 | 2 |

Japanese Patent Application No. 2014-107923 is incorporated herein by reference.

Although some preferred embodiments have been described, many modifications and variations may be made thereto in s light of the above teachings. It is therefore to be understood that the invention may be practiced otherwise than as specifically described without departing from the scope of the appended claims.

The invention claimed is:

1. An ink composition comprising (A) 0.01 to 5% by weight of a polyether-modified silicone having the average compositional formula (I), (B) 0.01 to 5% by weight of a polyether-modified silicone having the average compositional formula (II), water, a water-soluble organic solvent, and a colorant,
    said polyether-modified silicone (A) having the average compositional formula (I):

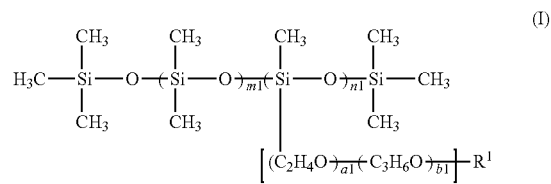

wherein $R^1$ is hydrogen, an alkyl group of 1 to 4 carbon atoms or acetyl group, m1 is an integer of at least 0, n1 is an integer of at least 1, m1+n1 is an integer of 1 to 6, a1×n1 is an integer of 2 to 20, b1×n1 is an integer of 0 to 100, and units (a1) and (b1) may be arranged randomly or blockwise,
    said polyether-modified silicone (B) having the average compositional formula (II):

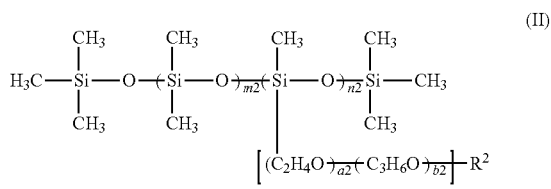

wherein $R^2$ is hydrogen, an alkyl group of 1 to 4 carbon atoms or acetyl group, m2 is an integer of at least 1, n2 is an integer of at least 1, m2+n2 is an integer of 15 to 40, a2×n2 is an integer of 5 to 100, b2×n2 is an integer of 0 to 100, and units (a2) and (b2) may be arranged randomly or blockwise.

2. An inkjet ink comprising the ink composition of claim 1.

* * * * *